United States Patent [19]

Ferber

[11] Patent Number: 4,633,078

[45] Date of Patent: Dec. 30, 1986

[54] OPTICAL INTERFERENCE ELIMINATOR

[75] Inventor: Alan Ferber, Hillside, Ill.

[73] Assignee: The Perkin-Elmer Corporation, Norwalk, Conn.

[21] Appl. No.: 757,996

[22] Filed: Jul. 23, 1985

[51] Int. Cl.[4] .............................................. H01J 3/14
[52] U.S. Cl. ..................................... 250/216; 356/326
[58] Field of Search ............... 350/286, 3.79; 356/308, 356/326, 328, 331; 250/216, 226

[56] References Cited

U.S. PATENT DOCUMENTS 2,945,132  7/1960  Schüch ................................ 250/216
4,084,153  4/1978  Ohen .................................. 350/3.79

FOREIGN PATENT DOCUMENTS 0105025  6/1983  Japan ................................. 356/331

Primary Examiner—David C. Nelms
Assistant Examiner—L. W. Madoo
Attorney, Agent, or Firm—E. T. Grimes; F. L. Masselle

[57] ABSTRACT

Wavelength related interference artifacts may appear superimposed on the output data curve of a scanning spectrophotometer utilizing a photodiode array as photometric detector. These may be suppressed by interposing a transparent optical element in the optical beam adjacent to its incidence on the array. Such an element should have no optical power along an axis parallel to the wavelength axis of the array and should provide varying phase displacement of the rays of the beam transverse to the wavelength axis. Several forms such an optical element may take are disclosed.

8 Claims, 6 Drawing Figures

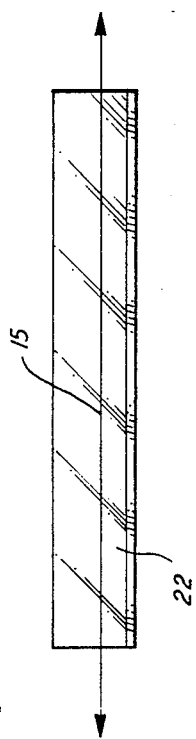
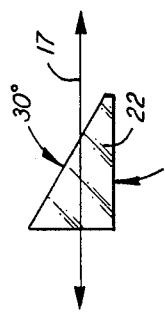
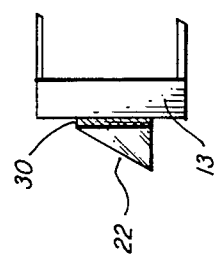
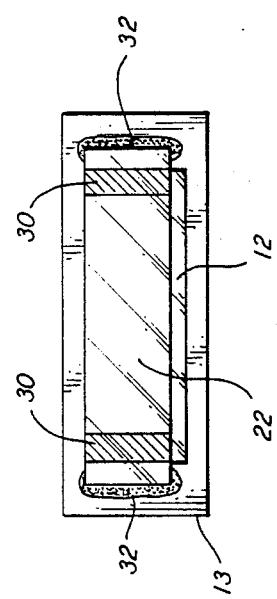

OPTICAL INTERFERENCE ELIMINATOR

FIELD OF INVENTION

This invention relates to spectrophotometry, and more particularly, to a means for elimination of variations of an optical interference type in the spectral output curve produced by a spectrophotometer using a photodiode array as the measuring photometric device.

This invention is related to U.S. patent application Ser. No. 704,356 filed Feb. 21, 1985. The disclosure therein is incorporated herein by reference. The two applications are assigned to the same Assignee.

BACKGROUND OF THE INVENTION

The application of a photodiode array (PDA) as the measuring photometric device for a spectrophotometer is normally to deliver as ordinate an output curve of intensity, or a related quantity such as percent transmittance or absorbance, plotted against wavelength as abscissa. This curve has been observed to be vitiated by the appearance of periodic ripples of small amplitude superimposed on the true curve. The periodicity of these ripples is typically a function of wavelength with the ripple peaks occurring at shorter wavelength intervals when measuring in the ultraviolet and increasing in spacing gradually as the wavelength increases to the infrared end of the curve. Investigation indicates this to be an interference phenomenon associated with the construction of the PDA. It is important to eliminate or minimize this objectionable artifact.

As a basis of this invention an optical means is disclosed which acts on the converging spectral beam falling on the receptor face of the PDA redirecting different parts of this beam in such a manner as to suppress the action causing the artifact.

It is an object of this invention to suppress an interference-like artifact on the output data curve of an array spectrophotometer.

It is a further object of this invention to suppress such artifacts without introduction of errors on the output data curve due to minute motions or position changes of the PDA or parts of the spectrophotometer monochromator.

It is further object of this invention that the means used for the foregoing objectives be an external addition to the PDA requiring no modification of the commercial PDA construction.

It is a further objective that the means used to suppress the artifact previously mentioned treats each array detecting element independently so that no stray light error or loss of resolution is incurred by light scatter or dispersion.

It is also an objective that no impairment of wavelength accuracy shall be incurred.

It is a further objective that no substantial attenuation of the intensity level of the output signal shall result.

BRIEF DESCRIPTION OF THE INVENTION

One function of a spectrophotometer is to present photometric data in graphic form which shows the wavelength location and shape of absorption bands specific to constituents of analytical samples. This function will be jeopardized if the analytical output curve also shows artifacts which either resemble or obscure legitimate absorption bands or their components.

It has been observed that such artifacts, typically in the form of periodic ripples superimposed on the valid analytical curve, may appear when a certain photodiode array is used as a detector. The phenomenon appears to be associated, as will be discussed later in detail, with the thickness and nature of a protective layer present on the sensitive face of the array. Because the manufacture of such arrays involves exacting deposition procedures, still much in the forefront of the state of the art, it has not been generally practical to modify the fabrication of the array to eliminate the undesireable artifacts.

To some extent it is possible to compensate for the observed artifact when applying the usual method of background correction by comparison of the sample output data curve with a reference curve taken on a blank. This well known procedure, however, is particularly sensitive to minor structural instabilities of the monochromator system which engender different artifacts for sample and reference due to slight shifts in the time interval between the taking of the two curves. It is therefore better to suppress the artifacts than to depend on compensation.

It has been found that these artifacts can be suppressed by the addition of a transparent optical component applied adjacent to the active face of the array. This component, which may take one of several shapes, intercepts the exit optical beam of the monochromator and redirects parts of said beam in an orderly manner so as to modify the conditions under which the beam is incident on each active element or "pixel" of the array.

The modifying component of this invention is essentially a bar of material transparent to light over the range of wavelengths passed by the spectrophotometer. The cross section of this bar is substantially constant along the axis parallel to the axis of wavelength change along the array so that no dispersive wavelength shift will be produced in the spectral image as it falls on the pixels of the array. The cross section can be a segment of a cylinder or another shape having refractive power in the direction transverse to the wavelength axis. In the preferred embodiment a triangular cross section has been found preferable for ease of fabrication as well as effectiveness and is used herein as the exemplary form. The modifier component can thus best be described as an optical wedge mounted so that its thickness varies transversely in the direction oriented from end to end of the individual pixel in the array. This wedge is fixed typically with about 0.03 inches spacing between one of its larger flat faces and the outside face of the protective window over the array. With this addition to the optical system the periodic ripple artifact has been found to be substantially eliminated.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of other methods and apparatus for carrying out the various purposes of the invention. It is important, therefore, that this disclosure be regarded as including such equivalent methods and apparatus as do not depart from the spirit and scope of the invention.

One embodiment of the invention has been chosen for purpose of illustration and description, and is shown in the accompanying drawings forming a part of the specification.

BRIEF DESCRIPTION OF THE DRAWINGS

FIG. 3A and 3B show an end view and a side elevation, respectively, of a preferred optical refracting means; and FIG. 4A and 4B show an end view and a side elevation, respectively, of a PDA assembly incorporating the invention.

DETAILED DESCRIPTION OF A PRESENTLY PREFERRED EMBODIMENT OF THE INVENTION

Figure 1:
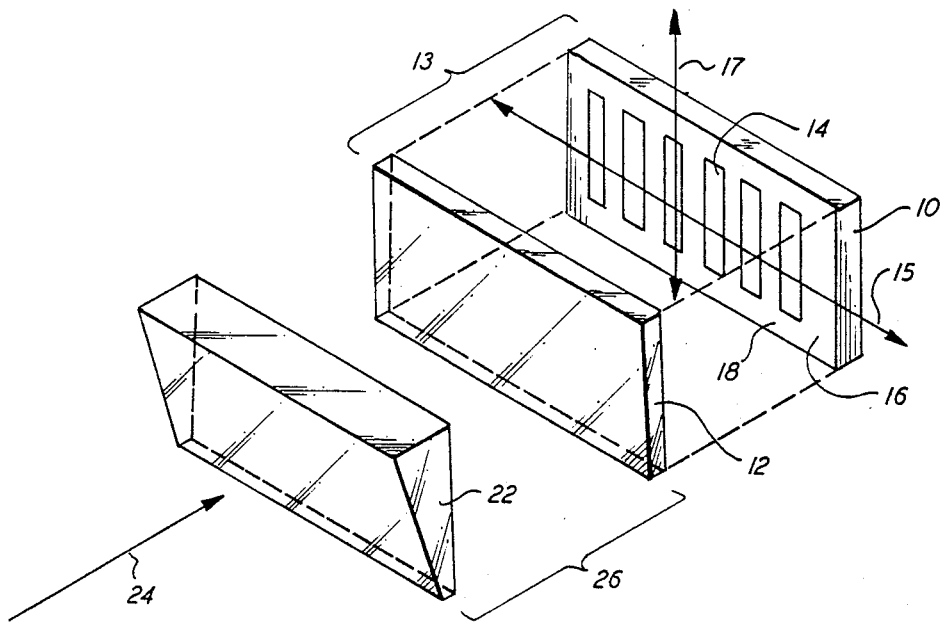
FIG. 1 shows an exploded diagram of a PDA assembly disposed to practice this invention.

In the presently preferred embodiment considered herein for exemplification of the invention, the exploded view shown in FIG. 1 will clarify the general relationships of the elements to be discussed herein. The photodiode array (PDA) 10, which is shown in a simplified form, is protected from physical damage by a protective window 12, here shown widely separated from the PDA for clarity. The window 12 is normally spaced a small distance from the face of the PDA, and is part of the PDA unit 13. The PDA chip 10 is a solid state monolithic unit fabricated on a single piece of silicon a little over 13 mm long in a manner similar to other monolithic integrated circuits. Other circuitry, not shown, is also included on this chip; this circuitry is not pertinent to this discussion and needs not be described herein. On the active face of the chip are deposited the photosensitive areas or pixels 14 which in this embodiment are 512 parallely disposed rectangles 2.5 mm long and about 12 $\mu$m wide spaced 25 $\mu$m apart, center to center. This structure is typically that of a Reticon RL512S. The chip 10 and window 12 are mounted on a carrier providing support means and connection means.

Although the PDA may be used without a protective window 12 for experimental purposes, it is much better in a laboratory instrument to provide the protection from solvents, corrosive vapors and handling provided by the protective window 12. Commercially the PDA unit can be secured either with or without the window 12. This window is a polished plane-parallel silica window typically 0.020±0.002 inches thick. Because of its relatively great thickness compared to the wavelength of the radiation in the optical beam, the window does not contribute any significant interference artifacts to the output data.

Figure 2:
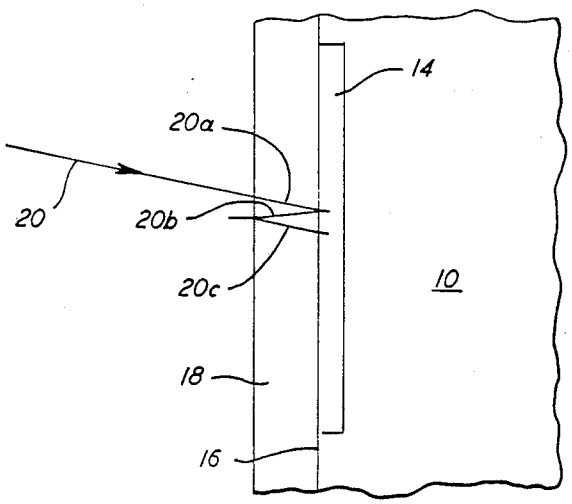
FIG. 2 shows detail of interference generation at the array surface.

The origin of the interference causing the output ripple artifact is believed to lie in a $SiO_2$ protective coating 18 which is deposited directly upon the active face 16 of the PDA chip. This coating is stated by the manufacturer to be typically between 3 to 5 $\mu$m thick. The generation of the interference artifact may be clarified by reference to FIG. 2, wherein a single ray 20 of the incident spectrum is depicted as falling on the array after passing through the protective coating 18. The segment of the ray initially penetrating the coating is designated as 20a. A few percent of said ray 20a will be reflected as segment 20b and then partly re-reflected as segment 20c. Ignoring phase changes at the interfaces for simplicity, the ray 20c will be in phase with ray 20a and its intensity will add thereto if the length of ray segments 20b plus 20c equals an integral number of wavelengths of the incident light in ray 20a. If the alternative condition exists wherein the length of 20b plus 20c is a half wavelength more or less than an integral number of wavelengths, the ray 20c will subtract from 20a and the intensity measured will be less. The former condition is known as constructive interference; the latter condition is known as destructive interference. As the spectrum is scanned by the array, therefore, an undulating artifact will be superimposed on the output curve as the wavelength changes from pixel to pixel.

To substantiate the above explanation, it will be apparent to one skilled in the art that the thickness of layer 18 can be calculated by considering the change in wavelength between successive peaks of the artifact ripple and the known index of refraction of the layer. A calculation of this thickness typically comes out to be about 3.9 $\mu$m which is in reasonable agreement with the manufacturer's stated thickness of this protective layer. The protective layer can therefore reasonably be considered the source of the ripple artifact.

For the ripple artifact to be a maximum, all rays being focussed on the array for any given pixel must show the same constructive interference. This will not generally be the case, however, as rays exhibiting different angles of incidence will have different lengths for segments 20b plus 20c. However, if the thickness of layer 18 is uniform the disparity of angle due to beam convergence will not reduce the artifact enough in practice. Fortuitously the original arrays used in this spectrophotometer had a poorly controlled protective layer thickness, not being optically flat, and the disparity of phase between rays striking a given pixel through different regions of this nonuniform layer was enough to minimize the artifact, although at the cost of some stray light scattered between pixels. Unfortunately control of the artifact by this method has not been found practical from a fabrication standpoint as presently supplied commercially.

Practice of the invention involves the addition of an optical means such as a thin wedge or prism 22, FIG. 1, disposed so that the exit beam 24 of the monochromator passes there-through before being incident on the PDA. It has been found that this can substantially suppress the interference artifact if properly oriented. The exact optical explanation for this unexpected non-obvious accomplishment is complex and is not deemed to be essential to this disclosure. The discussion to be given hereinafter covers aspects pertinent to the practice of the invention.

In selection of the preferred shape and placement of the wedge 22 of this embodiment of the invention the following characteristics are believed to be required:

1. The material of the wedge 22 should be suitably transparent over the useful wavelength range of the monochromator to permit desireably high signal/noise ratio.

2. Said material should not be optically active; i.e., it should not produce polarization effects.

3. The longitudinal cross-section of said wedge should be invarient. The longitudinal axis is shown as 15, FIG. 1.

4. The transverse cross-section of said wedge should be of varying thickness. Examples of such configuration could also include a segment of a circle, a shape with stepwise variation of thickness, or other variation accomplishing the transverse action on the rays of the optical beam to be hereinafter described. The transverse axis is shown as 17, FIG. 1.

5. The optical surfaces of the wedge must be polished so as to be free from roughness, scratches, pits or other optical defects which could cause longitudinal scatter of the optical beam.

6. The wedge should be rigidly mounted with its longitudinal axis substantially parallel to the axis passing through the center of each pixel in the array.

7. The wedge must be mounted immediately adjacent to the entrance window of the PDA. However, the face of the wedge should not be in contact with this window but should be separated therefrom sufficiently to avoid interference effects originating in the intervening air space. This space is not critical in magnitude. For convenience a space of 0.03 inches is typically used in the preferred embodiment.

Introduction of the above described wedge 22 into the optical beam before the beam becomes incident on the PDA has been observed to have a minimal effect on bandwidth, i.e., wavelength resolution, since said wedge has no optical power in the direction of its longitudinal axis. On the other hand, it is believed that the transverse optical characteristics of a wedge or of such shapes as described in section 4 above will affect the angles of incidence of the various rays in the optical beam according to their distribution when incident at various regions along each pixel length so as to modify and average out the interference effects causing the artifact. Thus the orderly periodic output variation from pixel to pixel vs wavelength will be substantially eliminated.

The requirements set forth above for the wedge have been determined empirically by observation of the performance of a number of production array spectrophotometers in normal use. These requirements and specifications should not be considered as limiting but indicative of actual practice of the invention. For example, FIGS. 3A and 3B illustrate the configuration of wedge 22 as used in the preferred embodiment. The angle of 30° has been selected partly for ease of fabrication and structural rigidity of the wedge. However, 20° to 45° have also been shown to be effective in suppressing the interference artifact. This suppression ability diminishes for angles less than 20° becoming negligible for a plane parallel plate. The surface specification in section 5 above has also been derived from performance results in the 200 to 300 nm UV region. Scatter from a surface showing visible "lemon peel" or flatness defects can cause serious errors in both stray light and resolution in this region.

While the optical means herein referred to as wedge 22 can be placed into the optical beam of the spectrophotometer and secured therein in a variety of ways, FIGS. 4A and 4B show the structure used in the preferred embodiment. This has the advantage of providing an integrated unit assembly which can be handled as if it were the PDA along for focussing and alignment. Also having this structure as a unit makes servicing and replacement, if necessary, simpler. In this structure the spacing as indicated at 26 in FIG. 1, required between the wedge 22 and the PDA window 12 is provided by two shims 30, FIGS. 4A and 4B, cut from double-coated adhesive tape. After mounting wedge 22 to the PDA 13 the unit is tested for performance including suppression of interference artifacts. If satisfactory the wedge 22 is permanently and rigidly secured to the PDA unit with epoxy cement 32, FIG. 4A, applied at both ends.

The interposition in the optical beam of a wedge, as shown in the preferred embodiment, will transversely deviate the beam falling on the array and will also change the position of the exit focal plane. to correct for these effects the following procedure is effective. First, alignment of the monochromator using a laser in the zero order of the grating is performed in the usual manner. This alignment establishes the position of the central ray on the array, thus correcting for deviation. Slightly tilting the array then may be done to establish the best focus so as to minimize the bandwidth as shown on the output display.

In illustrating the invention by disclosure of the presently preferred embodiment as set forth herein, it is not the intention of the inventor to be limited solely thereto. It is believed, for instance, that the wedge 22 could be substituted for window 12 in the original manufacture of the array thereby eliminating the window while accomplishing the same suppression of the interference artifact as performed by the present use of a separate wedge 22. It is further believed that as another option the protective layer 18 itself could be deposited from an oblique direction or through an apertured or moving mask onto the chip so as to provide the requisite variation in transverse thickness which, as shown heretofore would result in disparity of interference generated at different regions along the length of a given pixel thus averaging out the artifact. Further, as yet another option, the protective window could be mounted at an angle established in the transverse direction so that a wedge shaped film of air is provided adjacent to the face of the array again providing the varying phase shift along the length of each pixel which suppresses the artifact.

Although a certain particular embodiment of the invention has been herein disclosed for purposes of explanation, together with several modifications thereof, various other modifications thereof, after study of the specification, will be apparent to those skilled in the art to which the invention pertains, and reference should accordingly be had to the appended claims in determining the scope of the invention.

What is claimed is:

1. Apparatus for preventing interference artifacts in the photometric output curve of a spectrophotometer utilizing a photodiode array as photometric detector, comprising, in combination:

optical means disposed with a longitudinal axis parallel to the axis passing through the center points of all the pixels of said array;

said optical means possessing constant cross section in said longitudinal direction;

said optical means being transparent to radiation throughout a preselected wavelength range of interest;

said optical means having varying thickness in the transverse direction parallel to the long axis of each of said pixels; and said optical means being disposed to intercept the monochromator optical beam before incidence on the active face of said array.

2. The apparatus of claim 1 wherein said optical means constitutes a protective layer deposited on the active face of said array.

3. The apparatus of claim 1 wherein said optical means comprises a window member separated from the active face of said array by an air film.

4. The apparatus of claim 3 wherein said air film possesses varying thickness in said transverse direction.

5. The apparatus of claim 1 wherein said optical means comprises a plane parallel window of constant thickness separated from the active face of said array by an air film possessing varying thickness in the said transverse direction.

6. The apparatus of claim 1 wherein said optical means constitutes an optical wedge of triangular cross section.

7. The apparatus of claim 6 wherein said wedge is spaced far enough from said array or any window covering said array to prevent interference fringe formation in said intervening space.

8. The apparatus of claim 6 wherein the light transmitting faces of said wedge are polished planes free from optical defects capable of causing longitudinal scatter of the transmitted light beam.

* * * * *